(12) United States Patent
Forrer, Jr. et al.

(10) Patent No.: US 7,310,715 B2
(45) Date of Patent: Dec. 18, 2007

(54) METHOD, APPARATUS, AND COMPUTER PROGRAM PRODUCT FOR USING AN ARRAY OF HIGH PERFORMANCE STORAGE DRIVES INCLUDED IN A STORAGE ARRAY TO REDUCE ACCESSING OF AN ARRAY OF LOWER PERFORMANCE STORAGE DRIVES INCLUDED IN THE STORAGE ARRAY

(75) Inventors: Thomas R. Forrer, Jr., Round Rock, TX (US); Jason Eric Moore, Austin, TX (US); Asghar Tavasoli, Austin, TX (US); Abel Enrique Zuzuarregui, Paige, TX (US)

(73) Assignee: International Business Machines Corporation, Armonk, NY (US)

( * ) Notice: Subject to any disclaimer, the term of this patent is extended or adjusted under 35 U.S.C. 154(b) by 516 days.

(21) Appl. No.: 11/034,265

(22) Filed: Jan. 12, 2005

(65) Prior Publication Data

US 2006/0156060 A1 Jul. 13, 2006

(51) Int. Cl.
 *G06F 12/00* (2006.01)
(52) U.S. Cl. .................................. 711/162; 711/165

(58) Field of Classification Search ................ 711/162, 711/165; 718/105
See application file for complete search history.

(56) References Cited

U.S. PATENT DOCUMENTS

| 5,754,756 A * | 5/1998 | Watanabe et al. ............... 714/6 |
| 7,103,740 B1 * | 9/2006 | Colgrove et al. ............ 711/162 |
| 2004/0068610 A1 * | 4/2004 | Umberger et al. .......... 711/114 |
| 2005/0193167 A1 * | 9/2005 | Eguchi et al. .............. 711/114 |
| 2006/0010290 A1 * | 1/2006 | Sasamoto ................... 711/114 |
| 2006/0129771 A1 * | 6/2006 | Dasgupta et al. ........... 711/162 |

* cited by examiner

*Primary Examiner*—Brian R. Peugh
(74) *Attorney, Agent, or Firm*—Duke W. Yee; Mark E. McBurney; Lisa L. B. Yociss

(57) ABSTRACT

A method, apparatus, and computer program product are disclosed for controlling accesses of drives in a storage subsystem. A first array of a first type of drive is provided. The first type of drive is a server class of drive. A second array of a second type of drive is provided. The second type of drive is a PC class drive. The first and second arrays are bound together to form a single array of drives. The single array of drives is presented to a host that is coupled to the storage subsystem as a single array. The host is unaware that the single array includes two different types of drives. Data is stored in the second array of drives. Data is migrated from the second array of drives to the first array of drives when an access rate of the second array of drives exceeds a threshold access rate for the second type of drive.

20 Claims, 6 Drawing Sheets

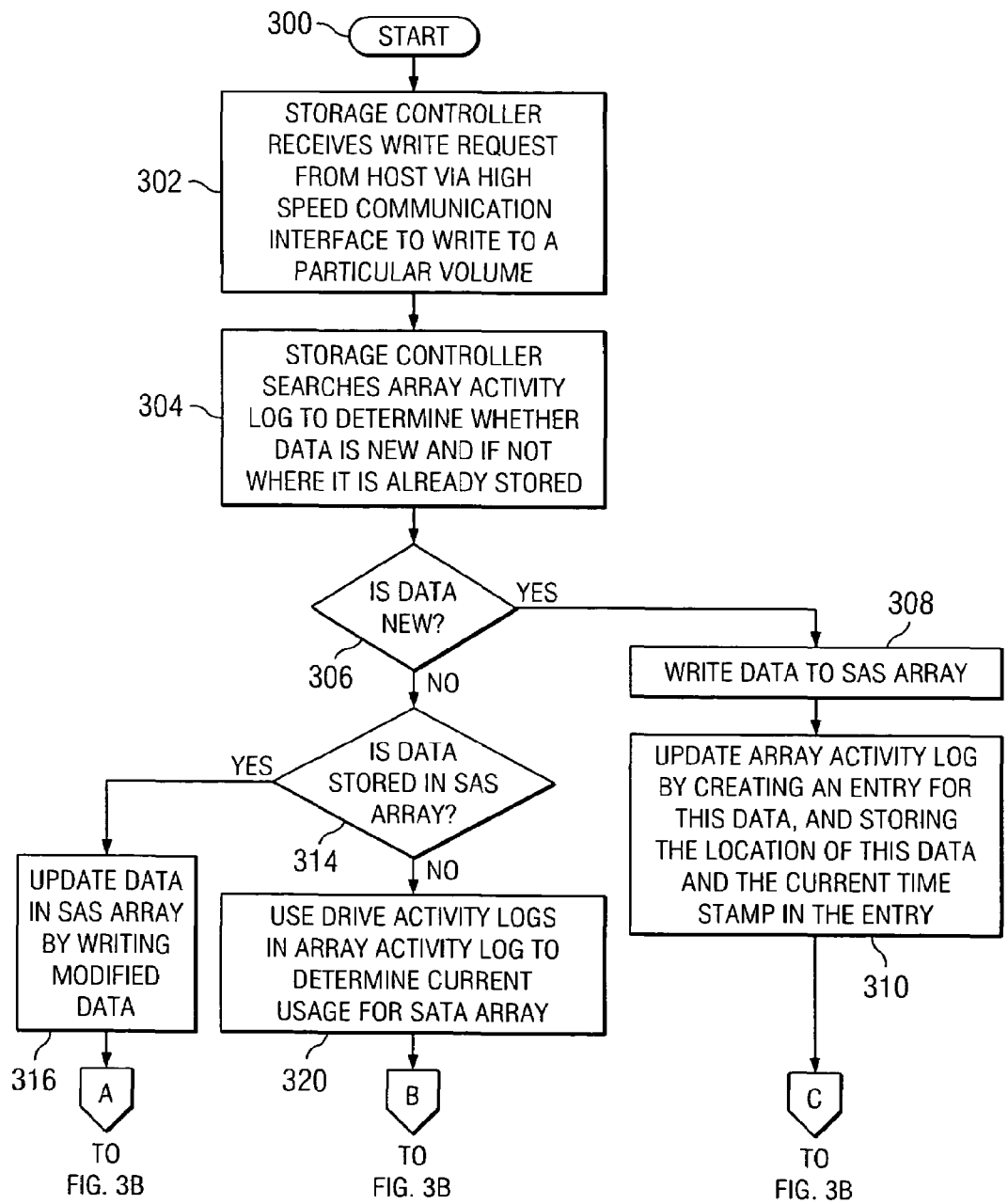

METHOD, APPARATUS, AND COMPUTER PROGRAM PRODUCT FOR USING AN ARRAY OF HIGH PERFORMANCE STORAGE DRIVES INCLUDED IN A STORAGE ARRAY TO REDUCE ACCESSING OF AN ARRAY OF LOWER PERFORMANCE STORAGE DRIVES INCLUDED IN THE STORAGE ARRAY

BACKGROUND OF THE INVENTION

1. Technical Field

The present invention is directed to data processing systems. More specifically, the present invention is directed to storage subsystems and a method, apparatus, and computer program product for using an array of high performance hard disk drives included in a large storage array to reduce usage of an array of lower performance and lower cost storage drives included in the same storage array.

2. Description of Related Art

Storage drives, such as ATA or SATA type hard disk drives, designed for use in personal computers (PCs) are beginning to be used more frequently in server type environments. Server environments require high performance storage drives, such as server class SCSI or SAS type drives, which are high duty cycle drives that support very frequent accessing rates and read/write usage. These server environment drives are capable of supporting many users simultaneously since they are designed to be accessed very frequently. These server drives are more expensive than PC drives.

Along with the lower cost of PC drives comes lower performance and reliability as compared to the server drives. The ATA or SATA drives are not designed for the continuous high I/O per second workload demanded in a server environment. Typically, ATA or SATA disk drive reliability specifications are based on the drive being powered on only eight hours per day, five days a week and having a 20% duty cycle. A 20% duty cycle means that the drive is seeking, reading, or writing only 20% of the time that it is powered on.

For the server class of drives such as the SAS drives, it is assumed that the drives will be powered on 24 hours per day, seven days a week with a duty cycle that can approach 100% during peak business hours.

Because the lower performance SATA drives are much less expensive than the server class of SAS drives, the SATA drives are beginning to be implemented more often in server environments. One solution to the performance issue described above when a lower performance drive is implemented in an environment that requires high performance has been to limit the number of I/O operations, i.e. accesses, to the lower performance drives. While this approach may increase the reliability of the lower performance drive in the high performance environment, it reduces the performance of the overall storage subsystem that includes the drives.

Therefore, a need exists for a method, apparatus, and computer program product in a high performance server environment for using an array of high performance storage drives included in a storage array to reduce accessing, i.e. usage, of an array of lower performance drives that are also included in the storage array.

SUMMARY OF THE INVENTION

A method, apparatus, and computer program product are disclosed for controlling accesses of drives in a storage subsystem. A first array of a first type of drive is provided. The first type of drive is a server class of drive. A second array of a second type of drive is provided. The second type of drive is a PC class of drive. The first and second arrays are bound together to form a single array of drives. The single array of drives is presented to a host that is coupled to the storage subsystem as a single array. The host is unaware that the single array includes two different types of drives. Data is stored in the second array of drives. Data is migrated from the second array of drives to the first array of drives when an access rate of the second array of drives exceeds a threshold access rate for the second type of drive. The data that is chosen to be migrated from the second array to the first array is the data in the second array of drives that is accessed more frequently. Thus, frequently used data is accessed from the array of the first type of drives and less frequently used data is accessed from the array of the second type of drives.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
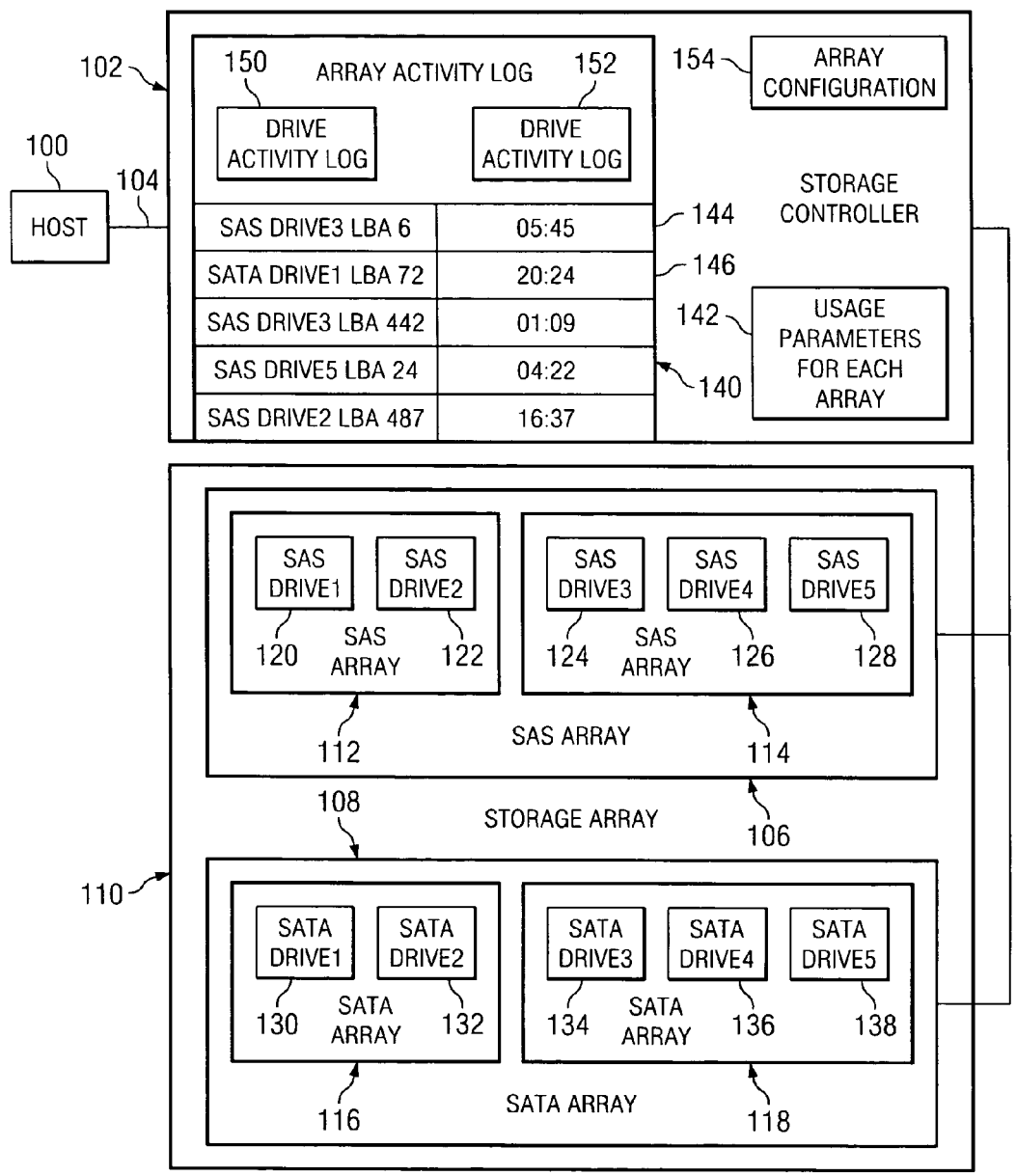
FIG. 1 is a block diagram of a storage subsystem that is coupled to a host in accordance with the present invention.

A preferred embodiment of the present invention and its advantages are better understood by referring to the figures, like numerals being used for like and corresponding parts of the accompanying figures.

The present invention includes a storage subsystem. The storage subsystem includes a storage controller and a storage array. The storage array includes a first array of high performance drives and a second array of lower performance drives. Both arrays will be coupled to the same storage controller that will manage the combination of arrays as if they were one single array of drives. The higher performance server class of drives of the first array will be used to store data that is frequently accessed thus reducing the accessing of the lower performance non-server class drives in the second array. Data will be migrated between these two arrays based on how frequently the drives in the arrays are being accessed. In this manner, the server class of drives and the non-server class of drives will share the same hardware infrastructure of the storage controller. This allows the ratio of non-server drives to server drives to be adjusted dynamically by the single storage controller based on actual data access patterns of the first and second arrays.

According to the present invention, the storage array includes a first array and a second array. The first array of drives is preferably an array of SAS drives. The second array of drives is preferably an array of SATA drives. Thus, the single storage array includes a SAS array and a SATA array.

The present invention provides a storage subsystem that is preferably a RAID subsystem. A RAID subsystem includes a RAID controller, a cache within the controller, and a storage array of attached disk drives. All data bound for the storage array is processed by the RAID controller, placed in the controller's cache, and then sent to the array of disks based upon the RAID type of implementation being used. Data read from the storage array follows the same path in reverse.

According to the present invention, time stamps are associated with the data, whenever the data is read or written, and stored in an Array Activity Log. The Array Activity Log includes an entry for each piece of data that is stored in the storage array. The location of the data and a time stamp that indicates the time the data was most recently accessed are stored in the entry in the log for that data. The data that was most recently accessed is assumed to be the data that is most frequently used.

When data is to be written to or read from the storage array, the controller will determine whether the SATA array is being accessed too frequently. If the SATA array is being accessed too frequently and the SAS array has room to store additional data, the data will be written to the SAS array. In the case of reads, if the SATA array is being accessed too frequently and the SAS array has room to store additional data, the data to be read will be migrated from the SATA array, stored in the SAS array, and then read from the SAS array. In this manner, throttling of data by migrating data between the SAS array and the SATA array can be minimized by the process described above.

When throttling is necessary, the controller will migrate data between the SATA array and the SAS array. If the SAS array is too full and there is available space in the SATA array, the least recently accessed data that is stored in the SAS array will be migrated from the SAS array to the SATA array. If the SATA array is too full and there is available space in the SAS array, the most recently accessed data that is stored in the SATA array will be migrated from the SATA array to the SAS array. If the SAS array is too full and there is no available space in the SATA array or the SATA array is too full and there is no available space in the SAS array, the system administrator will be notified that additional SAS or SATA drives need to be added.

Either SAS or SATA drives can be inserted in the large single storage array as required in order to optimize the cost versus performance of the storage subsystem. The high performance SAS drives are added only if the storage controller has to access the lower cost SATA drives too frequently. The SATA drives used in this application will preferably have built in throttling algorithms which will be invoked by the drive when it determines that read/write commands are being received at rates that would compromise the reliability of the SATA drives. As a result the overall performance of the array will degrade because of the added latencies caused by this self-induced drive throttling.

The high performance SAS drives act as a buffer between the host and the slower SATA drives so that the SATA drives are not accessed too frequently. Accessing the SATA drives at a rate that is higher than their designed rate can impair their operating ability.

The storage controller includes an array configuration which is a definition of the single storage array including a definition of each array in the storage array and an indication of which drives are assigned to which arrays in the storage array. When a new drive is added, the definition will change to include this new drive.

Either a SAS drive or a SATA drive can be physically plugged into any slot in the storage subsystem. The storage controller will interrogate the drive to identify what type of drive was plugged in. The storage subsystem will then assign the drive to the appropriate SAS or SATA array within the storage array. The SAS array includes only SAS drives while the SATA array includes only SATA drives. Thus, if the new drive is a SAS drive, it is assigned to the SAS array. If the new drive is a SATA drive, it is assigned to the SATA array.

FIG. 1 is a block diagram of a storage subsystem that is coupled to a host computer system 100 in accordance with the present invention. Host 100 is coupled to a storage controller 102 via a high speed communications interface 104. The storage subsystem includes storage controller 102 and a storage array 110.

Storage controller 102 is coupled to a first array of storage devices, such as SAS array 106, and a second array of storage devices, such as SATA array 108. Storage controller 102 may be a RAID controller. When the term "array" is used herein, it could mean an individual drive that adheres to the RAID 0 standard or a RAID implementation comprising multiple drives that adhere to the RAID 1, 3, 5, or 6 standard.

The first array of storage devices is an array of high speed devices that are high performance drives that are designed to be accessed frequently. These devices in the first array are suitable to be used as storage for an active large server computer system such that the drives are capable of concurrently supporting multiple users. These drives are preferably SAS drives. The first array is an array of a single type of drive, in this case SAS drives.

The second array of storage devices is an array of lower speed less expensive devices that are lower performance drives that are designed to be accessed less frequently. These devices in the second array are less expensive than the drives of the first array and are suitable to be used as storage for a personal computer for a single user, for example. These are "desktop" drives and are preferably SATA drives. The second array is an array of a single type of drive, in this case SATA drives.

The present invention binds the first and second arrays together to form one large storage array 110. The large single array 110 appears to host 100 as a single volume. A volume is defined as being a contiguous space of Logical Block Addresses (LBAs). The fact that the LBAs are physically located on different arrays and different types of drives in these arrays is transparent to host 100. The management of these LBAs is the responsibility of storage controller 102.

Each array may include multiple sub-arrays of drives. For example, SAS array 106 includes SAS array 112 and SAS array 114. Individual drives are included within these arrays. For example, SAS array 112 includes SAS drives 120 and 122. SAS array 114 includes SAS drives 124, 126, and 128. SATA array 116 includes SATA drives 130 and 132. SATA array 118 includes SATA drives 134, 136, and 138. The relationship among the sub-arrays and between a sub-array and its parent array is defined at the time the arrays are initially configured by the system administrator.

Additional SATA and/or SAS drives can be added to storage array 110. Storage controller 102 maintains a definition for each drive that is part of storage array 110. The definition indicates the type of drive and which array within storage array 110 the drive belongs to. Therefore, if an additional SAS drive is added, storage controller 102 will define the drive as being part of SAS array 106. If an additional SATA drive is added, storage controller 102 will define the drive as being part of SATA array 108.

According to the present invention, storage controller 102 includes an Array Activity Log 140 and usage parameters 142 for each array. These usage parameters 142 are passed to the controller 102 from the system administrator at the time the arrays are defined or via parameter information that is located in the arrays drives. These parameters are provided by the vendors of a drive and define a maximum operating parameter for that type of drive. The parameters are also referred to herein as a threshold access rate.

Array Activity Log 140 includes multiple entries, one for each piece of data that is stored in storage array 110. For example, Log 140 includes an entry 144 which indicates that a particular piece of data is stored in SAS drive 3 at LBA 6 within that drive. This data was last accessed, either by being read or written, at 5:45 am. Log 140 includes an entry 146 which indicates that a particular piece of data is stored in SATA drive 1 at LBA 72 within that drive. This data was last accessed at 8:24 pm.

A date stamp (not shown) is also preferably stored in Log 140 along with each time stamp. When a time stamp is stored or updated in Log 140 as described below, a date stamp is also stored or updated.

A separate drive activity log is maintained within log 140 for each drive in storage array 110. Each drive is associated with its own drive activity log. Although only two drive activity logs are depicted, a separate drive activity log is included in log 140 for each drive. For example, drive activity log 150 and drive activity log 152 are depicted.

Each drive activity log maintains a number of accesses of its associated drive. Thus, each time a drive is accessed to seek, read, or write data, the drive activity log associated with that drive will be updated to reflect an additional access. In this manner, each drive activity log stores the current number of times that drive has been accessed.

Storage controller 102 also includes an array configuration 154. Array configuration 154 includes a definition of each array and sub-array that is included in storage array 110. Each drive included in storage array 110 is configured within array configuration 154 to be part of an array. For example, when a new drive is added, the drive is added to the array of the same type of drives. If the new drive is a SAS drive, it is added to SAS array 106. If the new drive is a SATA drive, it is added to SATA array 108. In this manner, new drives can be added transparently to host 100.

Figure 2:
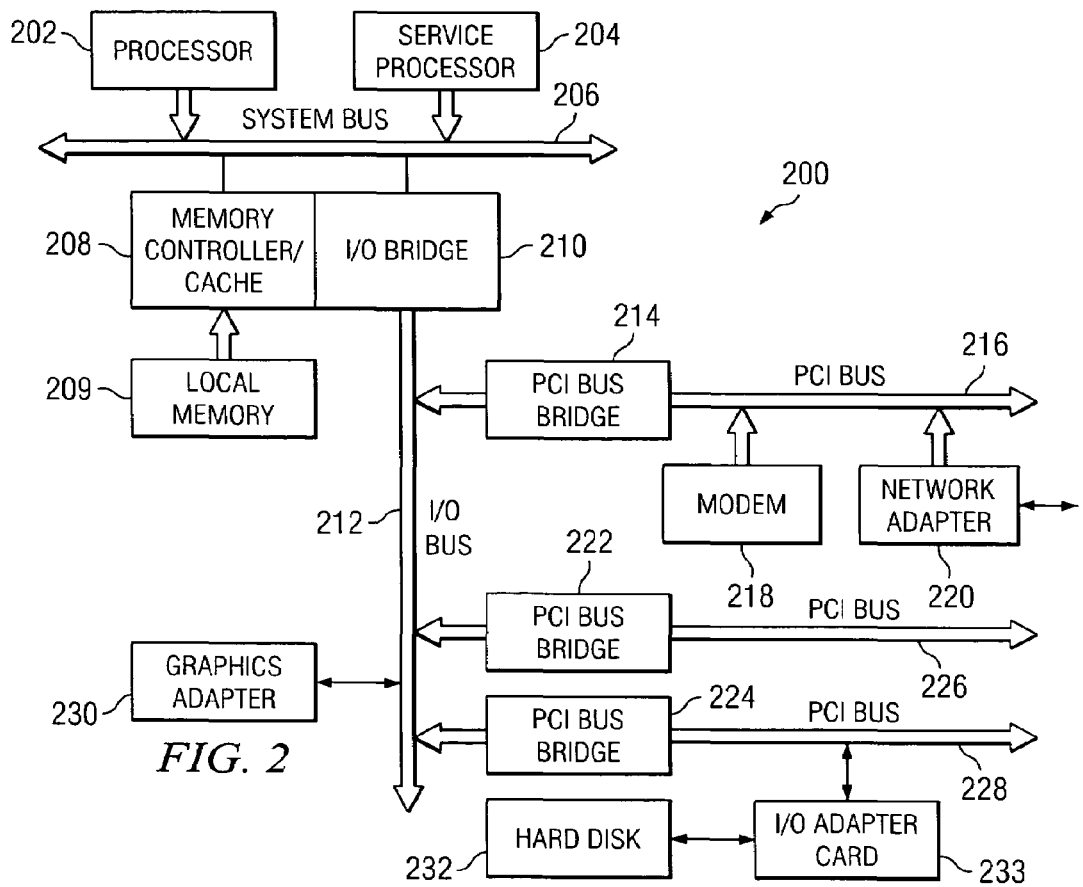
FIG. 2 is a block diagram of a computer system that includes a storage drive, such as a hard disk drive, that includes the present invention in accordance with the present invention.

FIG. 2 is a block diagram of a computer system that includes a storage drive, such as a hard disk drive, that includes the present invention in accordance with the present invention. Data processing system 200 may be a symmetric multiprocessor (SMP) system including a plurality of processors 202 and 204 connected to system bus 206. Alternatively, a single processor system may be employed. In the depicted example, processor 204 is a service processor. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI bus 216. Typical PCI bus implementations will support four PCI expansion slots or add-in connectors. Communications links to other computers may be provided through modem 218 and network adapter 220 connected to PCI local bus 216 through add-in boards.

Additional PCI bus bridges 222 and 224 provide interfaces for additional PCI buses 226 and 228, from which additional modems or network adapters may be supported. In this manner, data processing system 200 allows connections to multiple network computers. A memory-mapped graphics adapter 230 may also be connected to I/O bus 212 as depicted, either directly or indirectly.

A storage device, such as hard drive 232, is coupled to a PCI bus, such as bus 228, via an I/O adapter card 233. Hard drive 232 may be implemented using any type of technology.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

Figure 3B:
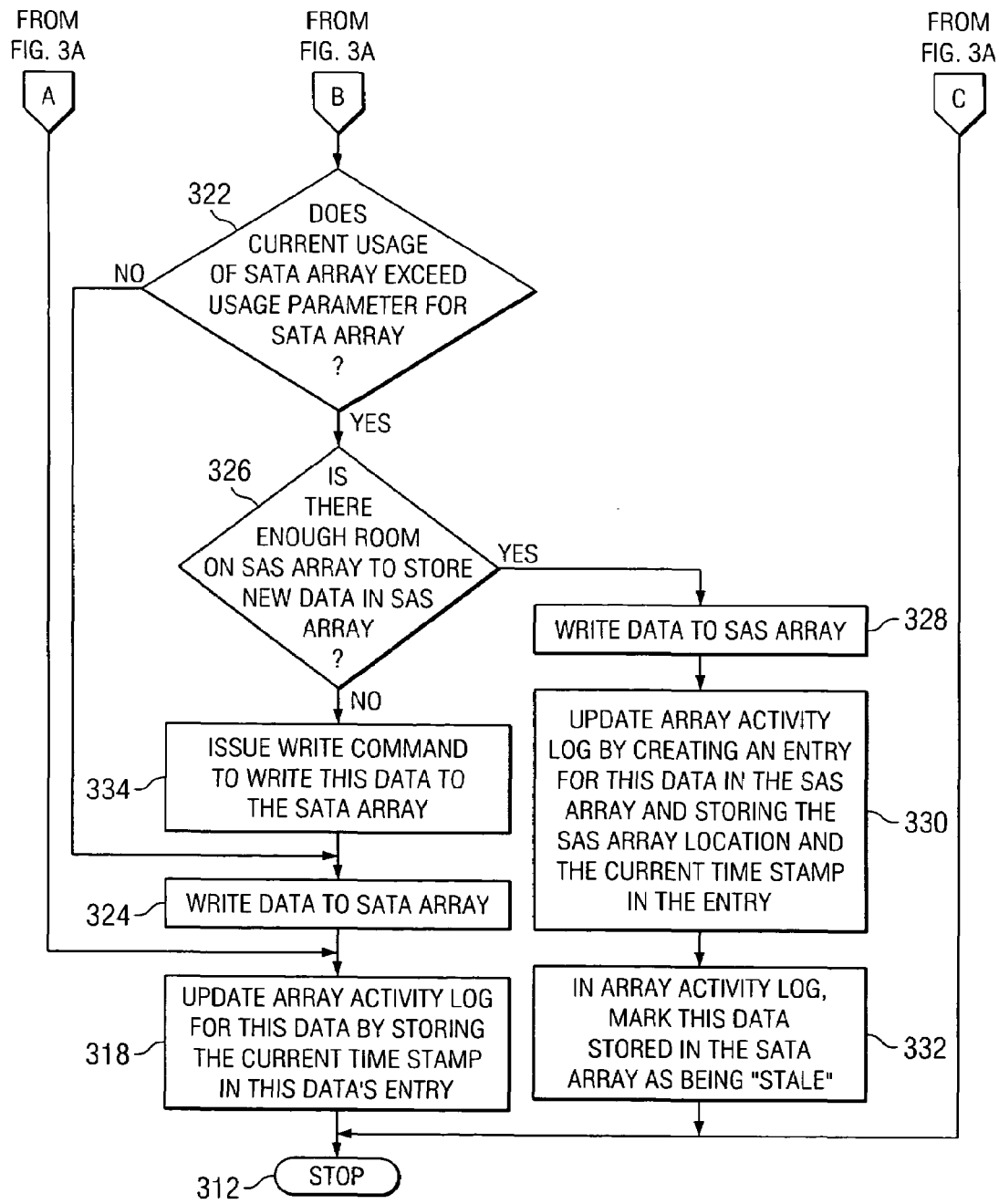
FIG. 3 illustrates a high level flow chart that depicts a write process for writing data to the storage subsystem of FIG. 1 in accordance with the present invention.

FIG. 3 illustrates a high level flow chart that depicts a write process for writing data to the array of storage devices of FIG. 1 in accordance with the present invention. The process starts as depicted by block 300 and thereafter passes to block 302 which depicts the storage controller receiving a write request from the host via the high speed communication interface. The write request is a request to write to a particular piece of data that is located in a particular volume. Next, block 304 illustrates the storage controller searching the entries in the Array Activity Log to determine whether the data is new. If this data is not new, the storage controller uses the Array Activity Log to identify where that data is already stored. The Array Activity Log is searched until this particular data is located. The data's entry in the log will indicate where the data is currently stored.

Thereafter, block 306 depicts a determination of whether or not this data is new. If there is no entry in the Array Activity Log, the data is determined to be new. If a determination is made that this data is new, the process passes to block 308 which illustrates writing the data to the SAS array. Next, block 310 depicts updating the Array Activity Log by creating an entry for this data in the log. The location where this data is stored in the SAS array is included in the entry. In addition, the current time stamp is also stored in the log. The process then terminates as illustrated by block 312.

Referring again to block 306, if a determination is made that the data is not new, the process passes to block 314. The data is not new when this data already has been stored in either the SAS array or the SATA array. In this case, the data is to be modified by this write request. There is already an entry in the Array Activity Log that indicates where this data is currently stored. Block 314 illustrates a determination of whether or not the data is currently stored in the SAS array. If a determination is made that the data is stored in the SAS array, the process passes to block 316 which depicts updating the data in the SAS array by writing the modified data that is included in the write request. Next, block 318 illustrates updating the Array Activity Log for this data by storing the current time stamp in this data's entry. The process then terminates as depicted by block 312.

Referring again to block 314, if a determination is made that the data is not stored in the SAS array, the process passes to block 320 which depicts using the drive activity logs in the Array Activity Log to determine the current usage for the drives in the SATA array. The drive activity logs of the SATA drives are used. Thereafter, block 322 illustrates a determination of whether or not the current usage of the SATA array exceeds the usage parameter for the SATA array. If a determination is made that the current usage of the SATA array does not exceed the usage parameter for the SATA array, the process passes to block 324 which illustrates writing the data to the SATA array. The process then passes to block 318.

Referring again to block 322, if a determination is made that the current usage of the SATA array does exceed the usage parameter for the SATA array, the process passes to block 326 which depicts a determination of whether or not there is enough room on the SAS array to write new data to the SAS array. If a determination is made that the there is enough room in the SAS array to write new data to the SAS array, the process passes to block 328 which illustrates writing the data to the SAS array. Next, block 330 illustrates updating the Array Activity Log by creating an entry in the log for this data that is now located in the SAS array. The SAS array location where the data is stored and the current time stamp are both included in this entry. Thereafter, block 332 depicts marking the entry as being "stale" in the Array Activity Log for this data that is stored in the SATA array. This is the entry that is associated with this piece of data that is stored in the SATA array. Because this data is not the current version of the data, the entry is marked as being stale which means the space occupied by this data is available for reuse by the array. The process then terminates as depicted by block 312.

Referring again to block 326, if a determination is made that the there is not enough room in the SAS array to write new data to the SAS array, the process passes to block 334 which illustrates issuing a write command to write this data to the SATA array. The process then passes back to block 324.

Figure 4:
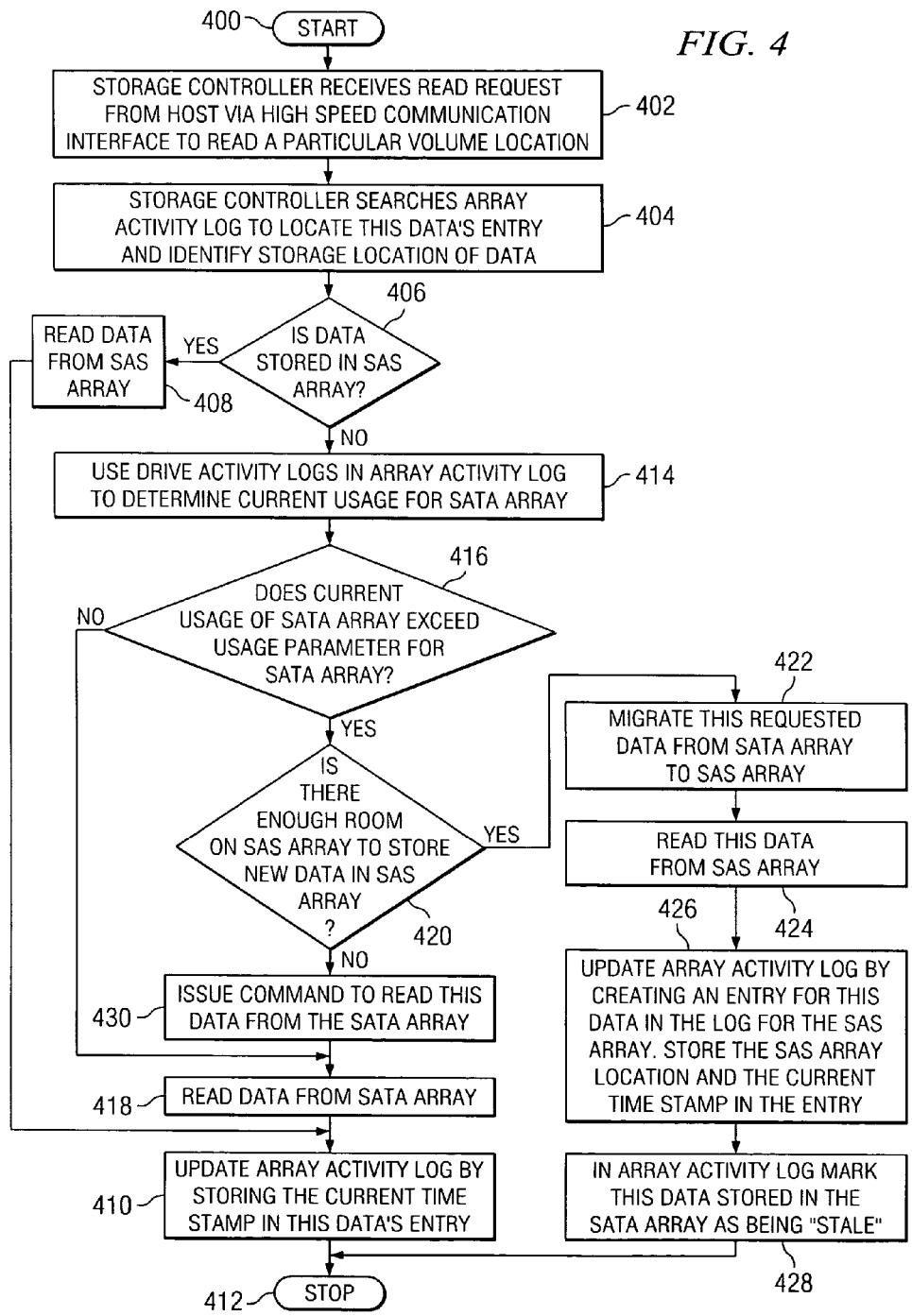
FIG. 4 depicts a high level flow chart that illustrates a read process for reading data from the storage subsystem of FIG. 1 in accordance with the present invention.

FIG. 4 depicts a high level flow chart that illustrates a read process for reading data from the array of storage devices of FIG. 1 in accordance with the present invention. The process starts as depicted by block 400 and thereafter passes to block 402 which illustrates the storage controller receiving a read request from the host via the high speed communication interface to read a particular piece of data in a particular volume. Next, block 404 depicts the storage controller searching the Array Activity Log to locate this data's entry and use the entry to identify where the data is located within the arrays.

The process then passes to block 406 which illustrates a determination of whether or not the data is currently stored in the SAS array. If a determination is made that the data is currently stored in the SAS array, the process passes to block 408 which depicts reading the data from the SAS array. Next, block 410 illustrates updating the Array Activity Log by storing the current time stamp in this data's entry. The process then terminates as depicted by block 412.

Referring again to block 406, if a determination is made that the data is not currently stored in the SAS array, the process passes to block 414 which depicts using the drive activity logs that are stored in the Array Activity Log to determine the current usage of the drives in the SATA array. Thereafter, block 416 illustrates a determination of whether or not the current usage of the SATA array exceeds the usage parameter for the SATA array. If a determination is made that the current usage does not exceed the usage parameter, the process passes to block 418 which depicts reading the data from the SATA array. The process then passes back to block 410.

Referring again to block 416, if a determination is made that the current usage of the SATA array does exceed the usage parameter for the SATA array, the process passes to block 420 which illustrates a determination of whether or not there is enough room on the SAS array to store new data in the SAS array. If a determination is made that there is enough room in the SAS array to store new data in the SAS array, the process passes to block 422 which depicts migrating this requested data from the SATA array to the SAS array. Block 424, then, illustrates reading the requested data from the SAS array. Thereafter, block 426 depicts updating the Array Activity Log by creating an entry in the log for this data that is now stored in the SAS array. The SAS location where the data is stored and the current time stamp are both stored in this entry. Next, block 428 illustrates marking the entry as being "stale" in the Array Activity Log for this data that is stored in the SATA array. This is the entry that is associated with this piece of data that is stored in the SATA array. Because this data is not the current version of the data, the entry is marked as being stale. The process then terminates as depicted by block 412.

Referring again to block 420, if a determination is made that there is not enough room on the SAS array to store new data, the process passes to block 430 which depicts issuing a command to read this data from the SATA array. The process then passes back to block 418.

Figure 5:
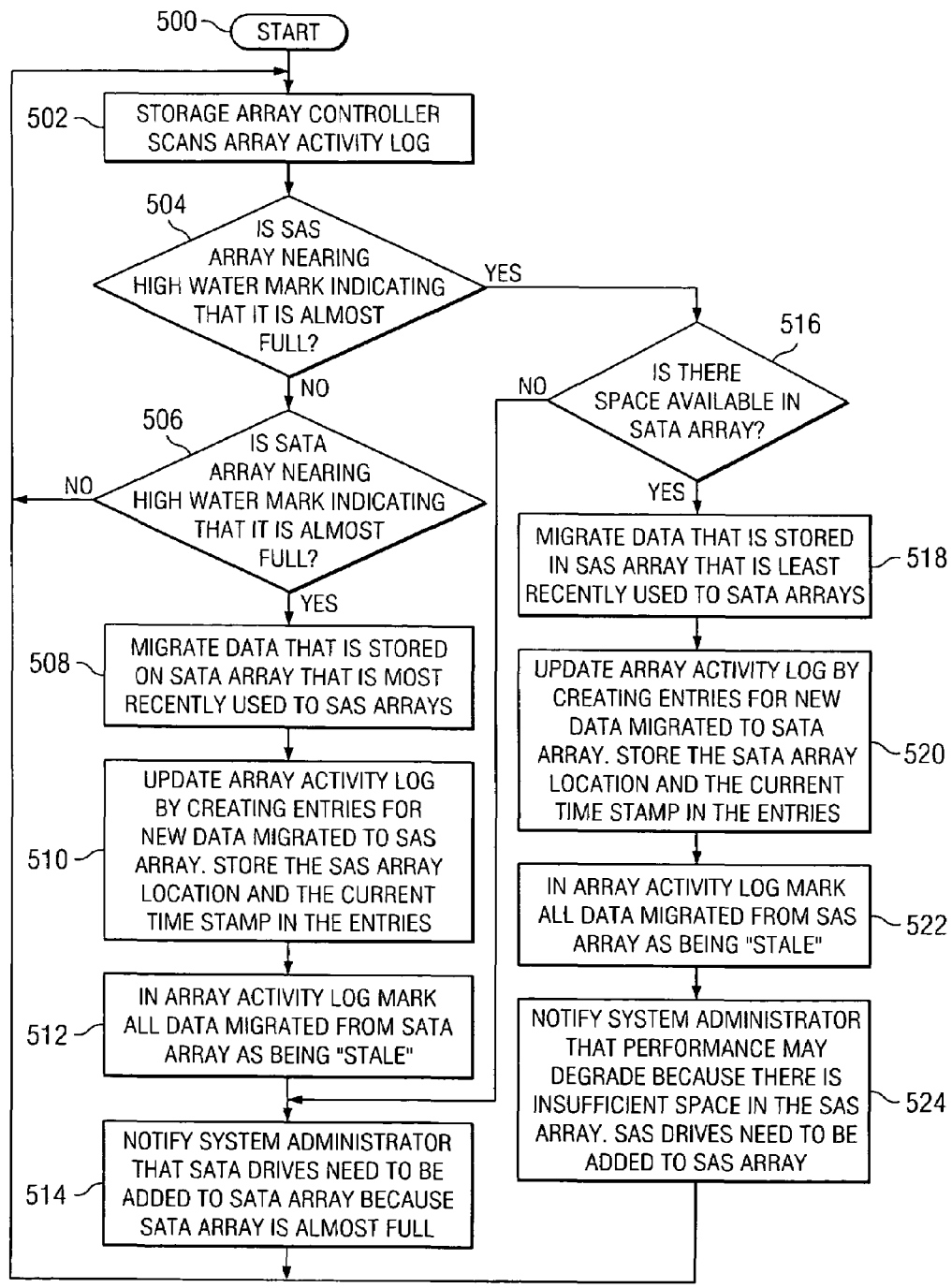
FIG. 5 illustrates a high level flow chart that depicts balancing of data stored in a storage subsystem of FIG. 1 by migrating data between arrays included in the storage subsystem in accordance with the present invention.

FIG. 5 illustrates a high level flow chart that depicts balancing of data stored in the array of storage devices of FIG. 1 by migrating data between arrays included in the storage subsystem in accordance with the present invention. The process starts as depicted by block 500 and thereafter passes to block 502 which illustrates the storage array controller scanning the Array Activity Log. Next, block 504 depicts a determination of whether or not the SAS array is nearing the high water mark indicating that it is almost full. If a determination is made that the SAS array is not nearing the high water mark, the process passes to block 506 which illustrates a determination of whether or not the SATA array is nearing the high water mark indicating that it is almost full. If a determination is made that the SATA array is not nearing the high water mark, the process passes back to block 502.

Referring again to block 506, if a determination is made the SATA array is nearing the high water mark which indicates that it is almost full, the process passes to block 508 which depicts migrating data from the SATA array to the SAS array. The data that is selected to be migrated is the data that is the most recently used data that is stored in the SATA array. This data is selected by looking at the time stamps in the Array Activity Log. Thereafter, block 510 illustrates updating the Array Activity Log by creating entries in the log for the data that has been migrated to the SAS array. The SAS array location and current time stamp are stored in the entry for each migrated piece of data. Block 512, then, depicts marking the SATA entries of the data that was migrated from the SATA array to the SAS array as being "stale". This marking is done in the Array Activity Log. These are the entries that indicate that this data is stored in a SATA drive.

The process then passes to block 514 which illustrates notifying the system administrator that SATA drives need to be added to the SATA array because the SATA array is almost full. The process then passes back to block 502.

Referring again to block 504, if a determination is made that the SAS array is nearing the high water mark indicating that it is almost full, the process passes to block 516 which depicts a determination of whether or not there is space available in the SATA array. If a determination is made that there is no space available in the SATA array, the process passes to block 514. Referring again to block 516, if a determination is made that there is space available in the SATA array, the process passes to block 518 which illustrates migrating data that is stored in the SAS array that is the least frequently used data. This data is selected by looking at the time stamps in the Array Activity Log.

Thereafter, block 520 illustrates updating the Array Activity Log by creating entries in the log for the data that has been migrated to the SATA array. The SATA array location and current time stamp are stored in the entry for each migrated data. Block 522, then, depicts marking the SAS entries of the data that was migrated from the SAS array to the SATA array as being "stale". This marking is done in the Array Activity Log. These are the entries that indicate that this data is stored in a SAS drive.

The process then passes to block 524 which illustrates notifying the system administrator that performance may degrade because there is insufficient space in the SAS array. SAS drives need to be added to the SAS array. The process then passes back to block 502.

Figure 6:
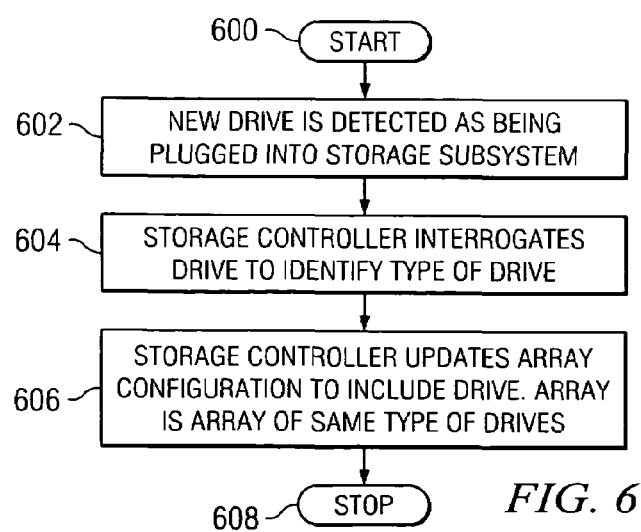
FIG. 6 depicts a high level flow chart that illustrates updating an array configuration to include a new drive that was added to the storage subsystem in accordance with the present invention.

FIG. 6 depicts a high level flow chart that illustrates updating an array configuration to include a new drive that was added to the storage subsystem in accordance with the present invention. The process starts as depicted by block 600 and thereafter passes to block 602 which depicts a new drive being detected as being plugged into the storage subsystem. Next, block 604 illustrates the storage controller interrogating the drive to identify the type of drive. Thereafter, block 606 depicts the storage controller updating an array configuration to include the drive. The drive is added to the array that includes this same type of drive. The process then terminates as illustrated by block 608.

It is important to note that while the present invention has been described in the context of a fully functioning data processing system. Those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data storage subsystem for controlling usage of drives in the subsystem, said method comprising:
providing a first array of a first type of drive, said first type of drive being a server class of drive;
providing a second array of a second type of drive, said second type of drive being a personal system class of drive;
binding said first array and said second array together to form a single array of drives, said single array of drives being presented to a host that is coupled to said storage subsystem as a single array, said host being unaware that said single array includes two different types of drives;
storing data in said second array of drives; and
migrating data from said second array of drives to said first array of drives when a usage rate of said second array of drives exceeds a threshold usage rate for said second type of drive.

2. The method according to claim 1, further comprising:
utilizing said first array of drives to buffer a usage rate of said second array of drives.

3. The method according to claim 2, further comprising:
utilizing said first array of drives to buffer said usage rate of said second array of drives by maintaining most recently accessed data in said first array of drives while maintaining least recently accessed data in said second array of drives.

4. The method according to claim 1, further comprising:
receiving a request to write data;
writing new data to said first array;
modifying data that is stored in said second array without migrating said data to said first array when usage rate of said second array does not exceed a threshold usage rate for said second type of drive; and
migrating said data to said first array when usage rate of said second array exceeds a threshold usage rate for said second type of drive.

5. The method according to claim 1, further comprising:
receiving a request to read data;
reading data from said second array without migrating said data to said first array when usage rate of said second array does not exceed a threshold usage rate for said second type of drive;
migrating said data to said first array when usage rate of said second array exceeds a threshold usage rate for said second type of drive; and
reading data from said first array after said data has been migrated.

6. The method according to claim 1, further comprising:
receiving a request to write data;
determining whether said data is new or whether said write request identifies existing data that is to be modified by writing modified data;
in response to determining that said data is not new, determining whether said existing data is stored in said second array;
in response to determining that said existing data is stored in said second array, determining whether a usage of said second array exceeds said threshold;
in response to determining that said usage of said second array does not exceed said threshold, modifying said existing data in said second array;

in response to determining that said usage of said second array does exceed said threshold, determining whether there is room in said first array to store additional data; and in response to determining that there is room in said first array, writing said modified data to said first array.

7. The method according to claim 1, further comprising:

receiving a request to read data;

determining whether said data is stored in said second array;

in response to determining that said data is stored in said second array, determining whether a usage of said second array exceeds said threshold;

in response to determining that said usage of said second array does not exceed said threshold, reading said data from said second array;

in response to determining that said usage of said second array does exceed said threshold, determining whether there is room in said first array to store additional data;

in response to determining that there is room in said first array, migrating said data from said second array to said first array; and reading said data from said first array.

8. An apparatus in a data storage subsystem for controlling usage of drives in the subsystem, said apparatus comprising:

a first array of a first type of drive, said first type of drive being a server class of drive;

a second array of a second type of drive, said second type of drive being a personal system class of drive;

said first array and said second array being bound together to form a single array of drives, said single array of drives being presented to a host that is coupled to said storage subsystem as a single array, said host being unaware that said single array includes two different types of drives;

data stored in said second array of drives; and data being migrated from said second array of drives to said first array of drives when a usage rate of said second array of drives exceeds a threshold usage rate for said second type of drive.

9. The apparatus according to claim 8, further comprising:

said first array of drives for buffering a usage rate of said second array of drives.

10. The apparatus according to claim 9, further comprising:

said first array of drives for buffering said usage rate of said second array of drives by maintaining most recently accessed data in said first array of drives while maintaining least recently accessed data in said second array of drives.

11. The apparatus according to claim 8, further comprising:

a request to write data;

new data being written to said first array;

data that is stored in said second array being modified without migrating said data to said first array when usage rate of said second array does not exceed a threshold usage rate for said second type of drive; and said data being migrated to said first array when usage rate of said second array exceeds a threshold usage rate for said second type of drive.

12. The apparatus according to claim 8, further comprising:

a request to read data;

data being read from said second array without migrating said data to said first array when usage rate of said second array does not exceed a threshold usage rate for said second type of drive;

said data being migrated to said first array when usage rate of said second array exceeds a threshold usage rate for said second type of drive; and data being read from said first array after said data has been migrated.

13. The apparatus according to claim 8, further comprising:

a request to write data;

said storage subsystem including a storage controller determining whether said data is new or whether said write request identifies existing data that is to be modified by writing modified data;

in response to determining that said data is not new, said storage controller determining whether said existing data is stored in said second array;

in response to determining that said existing data is stored in said second array, said storage controller determining whether a usage of said second array exceeds said threshold;

in response to determining that said usage of said second array does not exceed said threshold, said storage controller modifying said existing data in said second array;

in response to determining that said usage of said second array does exceed said threshold, said storage controller determining whether there is room in said first array to store additional data; and in response to determining that there is room in said first array, said storage controller writing said modified data to said first array.

14. The apparatus according to claim 8, further comprising:

a request to read data;

said storage subsystem including a storage controller determining whether said data is stored in said second array;

in response to determining that said data is stored in said second array, said storage controller determining whether a usage of said second array exceeds said threshold;

in response to determining that said usage of said second array does not exceed said threshold, said storage controller reading said data from said second array;

in response to determining that said usage of said second array does exceed said threshold, said storage controller determining whether there is room in said first array to store additional data;

in response to determining that there is room in said first array, said storage controller migrating said data from said second array to said first array; and said storage controller reading said data from said first array.

15. A computer program product for controlling usage of drives in a storage subsystem, said product comprising:

a first array of a first type of drive, said first type of drive being a server class of drive;

a second array of a second type of drive, said second type of drive being a personal system class of drive;

instructions for binding said first array and said second array together to form a single array of drives, said single array of drives being presented to a host that is coupled to said storage subsystem as a single array, said host being unaware that said single array includes two different types of drives;

instructions for storing data in said second array of drives; and instructions for migrating data from said second array of drives to said first array of drives when a usage rate of said second array of drives exceeds a threshold usage rate for said second type of drive.

16. The product according to claim 15, further comprising:

instructions for utilizing said first array of drives to buffer a usage rate of said second array of drives.

17. The product according to claim 16, further comprising:

instructions for utilizing said first array of drives to buffer said usage rate of said second array of drives by maintaining most recently accessed data in said first array of drives while maintaining least recently accessed data in said second array of drives.

18. The product according to claim 15, further comprising:

instructions for receiving a request to write data;
instructions for writing new data to said first array;
instructions for modifying data that is stored in said second array without migrating said data to said first array when usage rate of said second array does not exceed a threshold usage rate for said second type of drive; and
instructions for migrating said data to said first array when usage rate of said second array exceeds a threshold usage rate for said second type of drive.

19. The product according to claim 15, further comprising:

instructions for receiving a request to read data;
instructions for reading data from said second array without migrating said data to said first array when usage rate of said second array does not exceed a threshold usage rate for said second type of drive;
instructions for migrating said data to said first array when usage rate of said second array exceeds a threshold usage rate for said second type of drive; and
instructions for reading data from said first array after said data has been migrated.

20. The product according to claim 15, further comprising:

instructions for receiving a request to write data;
instructions for determining whether said data is new or whether said write request identifies existing data that is to be modified by writing modified data;
in response to determining that said data is not new, instructions for determining whether said existing data is stored in said second array;
in response to determining that said existing data is stored in said second array, instructions for determining whether a usage of said second array exceeds said threshold;
in response to determining that said usage of said second array does not exceed said threshold, instructions for modifying said existing data in said second array;
in response to determining that said usage of said second array does exceed said threshold, instructions for determining whether there is room in said first array to store additional data; and
in response to determining that there is room in said first array, instructions for writing said modified data to said first array.

* * * * *